(12) United States Patent
Frisch et al.

(10) Patent No.: US 7,031,258 B1
(45) Date of Patent: Apr. 18, 2006

(54) DIGITAL DATA SYSTEM WITH LINK LEVEL MESSAGE FLOW CONTROL

(75) Inventors: Robert C. Frisch, Westford, MA (US); Bryan D. Marietta, Austin, TX (US); Daniel L. Bouvier, Austin, TX (US)

(73) Assignee: Mercury Computer Systems, Inc., Chelmsford, MA (US)

( * ) Notice: Subject to any disclaimer, the term of this patent is extended or adjusted under 35 U.S.C. 154(b) by 717 days.

(21) Appl. No.: 09/758,949

(22) Filed: Jan. 11, 2001

Related U.S. Application Data (60) Provisional application No. 60/175,856, filed on Jan. 13, 2000.

(51) Int. Cl.
*G01R 31/08* (2006.01)
*H04L 12/26* (2006.01)

(52) U.S. Cl. ...................................... 370/235; 370/527
(58) Field of Classification Search ................ 370/229, 370/230, 235, 236, 236.1, 236.2, 241, 242, 370/244, 252, 253, 216, 400, 401, 410, 412, 370/506, 522, 527, 528, 529, 231
See application file for complete search history.

(56) References Cited

U.S. PATENT DOCUMENTS

| | | | | |
|---|---|---|---|---|
| 5,598,568 | A | 1/1997 | Frisch | 712/29 |
| 5,664,091 | A * | 9/1997 | Keen | 714/18 |
| 5,848,062 | A * | 12/1998 | Ohno | 370/311 |
| 6,009,383 | A * | 12/1999 | Mony | 704/200 |

(Continued)

*Primary Examiner*—Brian Nguyen
(74) *Attorney, Agent, or Firm*—David J. Powsner; Nutter McClennen & Fish LLP (57) ABSTRACT

A digital data system comprises a plurality of links for passing messages between nodes, which may be end points such as memory or processing units, or intermediate or branch points such as routers or other devices in the system. A link level flow control is implemented by control symbols passed between adjacent nodes on a link to efficiently regulate message burden on the link. The control symbols may be embedded within in a message packet to quickly effect control on a link—such as reducing data flow, requesting retransmission of corrupted data, or other intervention—without disruption of the ongoing packet reception. A control symbol may be recognized within the packet by a flag bit, a marker such as a transition in a signal, or a combination of characteristics. The control symbol may be a short word, having a control action identifier code at defined bit positions to indicate the desired link-level control function. A node receiving the control symbol implements the designated control action while maintaining packet order data (such a bit positions and byte counts), and applying message housekeeping processing (such as error checking) as though the control symbol were absent. The control symbol is thus embedded in a manner such that a receiving node need not receive a complete message, or even a complete packet, before acting on the control symbol. The beginning and end of the interrupted packet, meanwhile, are handled as a single message packet, and are processed by the receiving node in properly-aligned bit positions, allowing message flow to continue along the link without interruption. Thus, retransmission of the affected packet or message is not required. The result is that control operations dictated by the embedded control symbol are effected immediately and without slowing down communications.

8 Claims, 4 Drawing Sheets

U.S. PATENT DOCUMENTS

| | | | |
|---|---|---|---|
| 6,208,645 B1 * | 3/2001 | James et al. | 370/389 |
| 6,285,663 B1 * | 9/2001 | Esmailzadeh | 370/311 |
| 6,438,613 B1 * | 8/2002 | Yeung et al. | 709/250 |
| 6,574,211 B1 * | 6/2003 | Padovani et al. | 370/347 |
| 6,671,712 B1 * | 12/2003 | Arimilli et al. | 709/201 |
| 6,690,670 B1 * | 2/2004 | Castellano | 370/395.1 |

* cited by examiner

DIGITAL DATA SYSTEM WITH LINK LEVEL MESSAGE FLOW CONTROL

REFERENCE TO RELATED APPLICATIONS

This application claims the benefit of priority of U.S. Provisional Patent Application Ser. No. 60/175,856, filed Jan. 13, 2000, entitled "Rio Bus Protocol," the entirety of the teachings of which are incorporated by reference.

BACKGROUND OF THE INVENTION

The current development of computer and embedded systems is burdened by divergent requirements. On one hand performance is expected to increase exponentially, while on the other hand the price of components is driven by market factors to continuously decrease. Developers are burdened with the challenge of increasing device density, or functional density, while decreasing the board space and ultimately the floor space that the components require. The physics of signal handling and transmission, and the need for standardized interconnects and scalable systems, impose further bounds on system development.

Many existing computer systems are built around a single high-speed common bus. When fast digital devices are connected to the bus, they can communicate more quickly, e.g., with higher frequency bus signals. However, as device bandwidth demands increase, each consumes a greater portion of the total bus bandwidth, so that the addition of a small number of high-speed devices quickly offsets overall bus bandwidth gains. Furthermore, interfacing such high bandwidth devices poses additional hardware problems in the physical environment of a typical computer system.

Typically, the connection between microprocessors and peripherals in a computer system has through a hierarchy of shared buses. Devices are placed in an appropriate position in the hierarchy, given their respective levels of performance. Low performance devices are placed on lower performance buses, that are bridged to the higher performance buses, so as to not burden the higher performance devices. Bridging is also used to interface legacy interfaces.

Objectively, the need for higher levels of bus or interconnect performance is driven by two key demands. First is the need for raw data bandwidth to support higher performance peripheral devices. Second is the need for higher degrees of system concurrency. Increasingly, system designers are relying on distributed direct memory access (DMA) and distributed processing to meet these demands.

Over the past several years, the shared multi-drop bus has been exploited to its full potential. Many techniques have been applied to enhance the effective bus bandwidth, such as increasing frequency, widening the interface, transaction pipelining, split transaction, and out of order completion. Continuing to work with a bus in this manner introduces several design issues. Increasing bus width, for example, raises conflicts with physical limitations on the maximum achievable frequency, in part, because of the difficulty of maintaining skew tolerance between signals. More signals also requires more complex hardware, e.g. pins and interface logic, resulting in higher product costs and fewer supported interfaces per device.

Another way to circumvent the bandwidth limitations of a multi-computer system having a common bus is through distributed communications. In this approach, the components of a system are interconnected by multiple local buses. Both the nature and number of local buses can be varied to match the communications needs of a particular system.

Yet another approach is a fabric-based interconnect system. Here, buses are not used as communications paths in the traditional sense. Rather, information is routed between end nodes via fabric of communications links and other nodes. Information traffic in fabric-based systems typically consists of messages having a distinct format and following a protocol. The message format may include routing or other information, in addition to data or "payload," such that each packet can be routed at high speed along the links to its destination. As applied to DMA systems, protocols must permit messages to be driven by the source (which requires access not only to a target, but also visibility into the target's address space), whereas other messages for other transactions or operations are typically steered by the destination.

In order to properly manage the transmission of message packets between hops of a fabric-based system, it is necessary to exchange control signals in a form of "handshake" signaling. Some prior art systems utilize additional, side band signal pins to support the handshake. Other systems have protocols requiring the explicit exchange of control message packets between nodes.

Fabric-based systems offer a number of distinct advantages, since the interconnect fabric may be set up or dynamically reconfigured to route data along available lines, and to provide alternate pathways between endpoints, so that messages, control operations and data may be routed on many paths without collision. Thus the distributed routing of a fabric interconnect message-passing system is advantageously applied to applications, such as distributed direct memory access (DMA) or distributed processing, to further enhance the efficiencies of those approaches.

However, a message-passing system requires adherence to strict protocols for its operation, and is still subject to bandwidth limitations and varying traffic along its constituent links. Moreover, the passing of messages along different links raises many potential failure points, where message corruption or deadlock may occur. Further, the prior art use of side band signal pins to support handshake signaling comes at a cost: more pins, more logic and more board "real estate." The alternative use of explicit control message packets for this purpose can prove expensive from a bandwidth and latency point of view.

An object of this invention is to provide improved digital data systems and methods of operation thereof.

A further object is to provide such systems and methods as provide improved control of traffic in a message-passing digital data system.

A related object is to provide such systems and methods as permit improved traffic control without requiring additional signaling pins and without undue consumption of bandwidth or increases in latency.

SUMMARY OF THE INVENTION

The present invention has application in a digital data system in which messages pass along a link interconnect fabric from one node or device to another node or device. The nodes may be end points (such as processor or storage units), or may be intermediate devices or branch points (such as routers or switches in the interconnect fabric). The interconnect fabric comprises a set of one or more routers, switches, electrical, optical, electroptical or other elements along which messages are passed. Messages are packets having a defined format including, e.g., a header portion with source and target addresses, and message-type or other codes, followed by one or more data or other fields.

In accordance with one aspect of the present invention, the nodes or fabric elements can utilize specially-delineated symbols to regulate flow control at the link level, i.e., between adjacent nodes and/or elements in the interconnect fabric. Flow control symbols are sent as out of band communications over a link on which a message is currently being transmitted, without corrupting the message. That is, they are sent during transmission of the data of a formatted message packet, but are structured to be detected and implemented by a node on the link without impairing the ongoing packet transmission. Such "embedded" control symbols permit immediate implementation of flow control to affect the ongoing message itself. The control symbols may be of various types effective to regulate message flow, identify faulty message data, and otherwise enhance the speed, accuracy or efficiency of communications over the link.

According to aspects of the invention, a message packet sent by one node on a link to a receiving node at the other end of the link is comprised of a sequence of symbols (e.g., 32-bit words) that are transmitted in order over the link. A frame signal is asserted at the start of the packet and marks the onset of the first symbol of the packet (e.g., the first 32-bit word). The subsequent symbols of a packet are aligned with word boundaries established by the frame signal. By way of physical example, a link communication chip node may employ an input or output port that is one byte wide in order to accept or transmit four-byte words. Alignment of the transmitted symbols on word boundaries allows the node, e.g., the chip, to operate internally with a slow (e.g., divided-down) clock, but dependably check and process bits and faithfully carry symbols being exchanged between endpoint nodes on the link.

In further aspects of the invention, a control symbol is sent within a message packet (i.e., after the first word of the packet) and is marked with an additional assertion of the frame signal. The receiving node recognizes this interceding, or out of band, symbol as an embedded control symbol, and may implement at the link level a control function represented by it, meanwhile maintaining the sequence and alignment of words of the ongoing message packet.

In a link fabric messaging system of this type, a message packet may defined for each of various transactions or communications between devices. Thus, for example, the system may utilize messages of one format for direct writes to memory; messages of another format for querying a remote device for status; messages of still another format for device configuration or other data; and so forth. Each message typically has a header and may have a data or other subsequent portion. The header can indicate message origin, destination, message type, size of data portion or other subsequent portion. The header may also include one or more error detection or correction codes, a priority code to govern message handling, and/or information that the receiving node may use for configuration or routing.

In general, a message received by a node may be placed in an input buffer, appropriate bit positions inspected for necessary information, particular bits or fields may be modified, and may be passed for transmission along another, or back along the same link, as appropriate to the message type. A node may take an unspecified period of time between receiving a packet and transmitting to the next node to allow for in-transit housekeeping, such as error checking and correction, coordination when words are received out of order in a multi-word message packet, setting up of further buffers, sending of an acknowledgement or a request for retransmission, and other such operations. Aspects of the invention provide systems as described above that utilize the aforementioned control symbols to coordinate intra-link communication between sending and receiving nodes during these operations.

Embedded control symbols of the type discussed above may effect various flow control actions. One embedded control symbol may be sent to a transmitting node to direct it to slow or effectively suspend (e.g., to idle) its transmission rate. Another may effect canceling of a packet transmission that is in process. Yet another may cause a sender to retransmit a packet or portion thereof. In systems according to the invention, these and other flow control symbols are implemented at the link level, i.e., they originate and are implemented by adjacent nodes without involving higher logical layers of the system.

In accordance with another aspect of the present invention, a node in a link fabric interconnect as described above may pass an IDLE state control symbol over a link to an adjacent node, for example, to keep a communication pathway open as a transmitter assembles data for transmission. At the other end of a link, a receiving node can inspect and process the IDLE state control symbol without burdening its own message handling buffers.

In accordance with another aspect of the present invention, a node that is receiving data on a link may send a THROTTLE control symbol on that link to the transmitting node. This symbol is used to slow an ongoing packet transmission or to delay further such transmissions by causing the transmitting node to send IDLE state control symbols. The THROTTLE control symbol, according to related aspects of the invention, may indicate a number of IDLE's the transmitting node is to issue. These may be specified by a four-bit value, T, in the THROTTLE symbol, such that, e.g., the transmitting node implements flow control by inserting $2^T$ IDLE state control symbols.

Nodes, according to further related aspects of the invention, may utilize specific values of T to instruct the transmitting node to undertake different actions. One such value, e.g., 1111, can be used to instruct the other transmitting node to disregard all previously transmitted THROTTLE control symbols (e.g., by clearing an idle-counter) and cease sending IDLE control symbols. Another value may be used to request a single IDLE to be sent in order to adjust the phase of incoming messages in relation to the local clock. Thus, a receiving node is able to better regulate the pacing of messages being sent to it, immediately controlling message flow at the link level in accordance with its buffer availability, processing ability or transmission resources.

In accordance with another aspect of the invention, a node that is transmitting on a link may send an embedded STOMP control symbol to abort an in-transfer packet and, thereby, to prevent further processing of a canceled or corrupted transmission by a downstream node. The transmitting node may send this control symbol, for example, when the in-transfer packet is known to be incomplete or corrupt. This may be the case, for example, if a packet is corrupted during construction or handling by the transmitting node. It may also be the case where the transmitting node has detected (or been notified of) an error in a packet received from an upstream node.

Related aspects of the invention provide a system as describe above in which a transmitting node utilizes a STOMP control symbol an end-of-packet code, e.g., signaling early termination of an in-transfer packet.

Still further aspects of the invention provide a system as described above in which a node that receives an embedded STOMP control symbol effects a range of housekeeping actions, e.g., purging one or more packets or messages from affected buffers and/or issuing a request for retransmission.

These and other aspects of the invention are evident in the drawings and the description that follows.

BRIEF DESCRIPTION OF THE DRAWINGS

Features and advantages of the invention and its structure and operation will be understood from the description and illustrative drawings herein, wherein.

DETAILED DESCRIPTION OF ILLUSTRATIVE EMBODIMENTS

Figures 1, 1A, 1B, 1C, 1D, 1E:
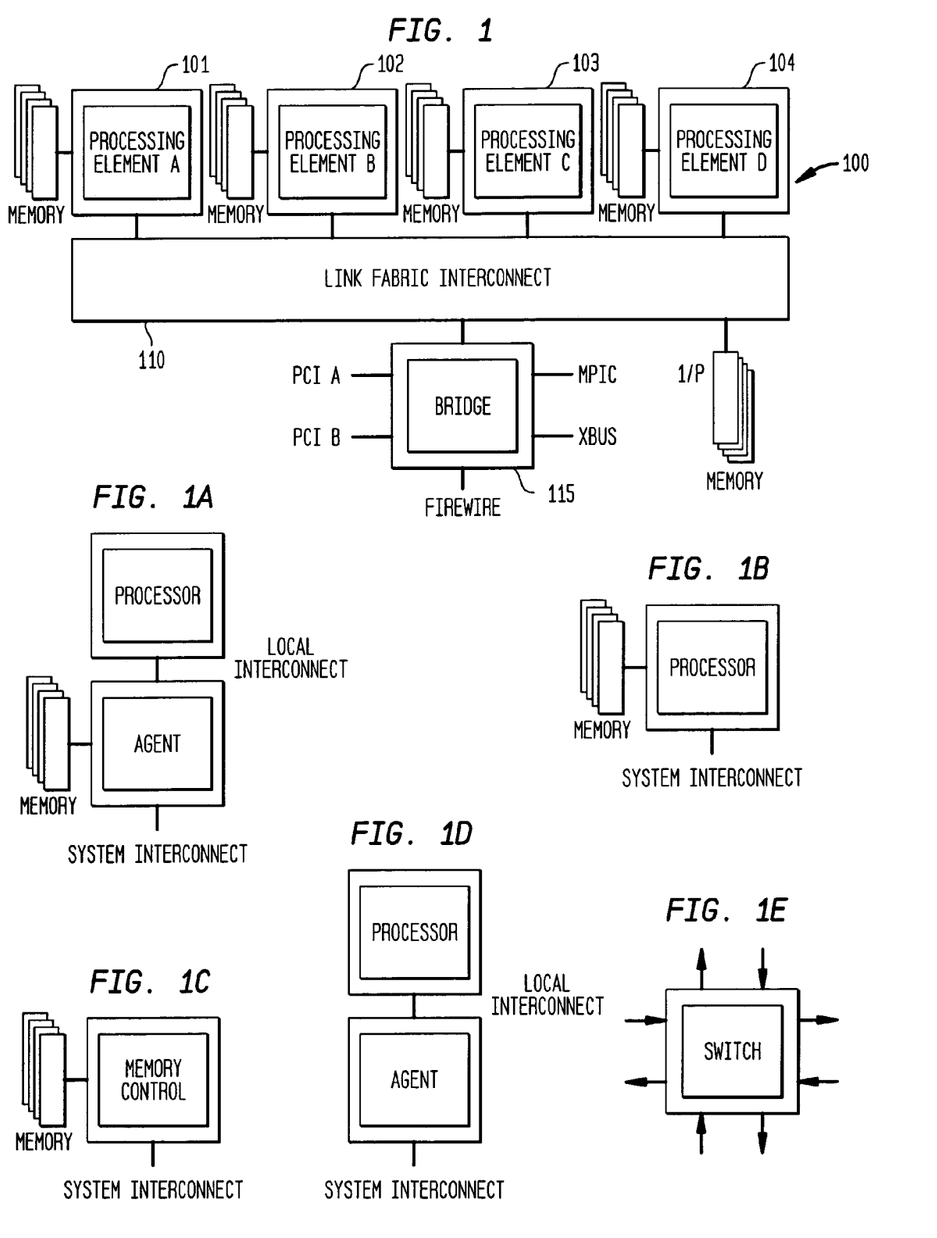
FIG. 1 illustrates a digital data system having a message passing system in accordance with the present invention.
FIGS. 1A–1E each illustrate a device that may be connected as a node or endpoint in the system of FIG. 1.

FIG. 1 illustrates generally an embodiment of a digital data system 100 employing link interconnect message communication in accordance with the present invention. The system includes a plurality of nodes, some of which are shown as digital devices 101, 102, 103, 104, . . . . In the illustrated embodiment, these are processors with associated memories, though, they may also comprise other digital devices capable of generating, handling and/or passing message packets.

In this regard, it will be understood that messaging over interconnected links as described herein has wide application, e.g., to systems that implement direct memory access, to systems that provide communications between processors in a domain, as well as to systems that provide such communications between lower-level digital devices or components. Examples of the former are provided by FIGS. 1 and 1A. Examples of the latter are provided by FIGS. 1B and 1D (a stand-alone processor or processor/agent with no storage or I/O capability—other than its interface to the link fabric); IC (a stand-alone memory with no processor—other than a controller that interfaces to the link fabric); and 1E (a switch processing element that receives multiple inputs along links in the interconnect fabric and generates corresponding output). Other devices or components in which such messaging has application include a bridge 115, as shown in FIG. 1, or an I/O device that operates to move data into or out of local or remote memory or that interfaces static storage or other devices or systems.

The illustrated devices 101, 102, 103, 104, . . . , are interconnected and communicate by a link fabric 110 (e.g., as indicated by lines connecting each device and the routers, switches and other elements of the fabric 110), which passes messages using buses, routers, switches, electrical, optical, electro-optical or other message-carrying elements. The routers and switches, by way of example, are vertices of the fabric. It will be appreciated that nodes 101, 102, 103, 104, . . . , may form vertices of the fabric as well. Conversely, it will be appreciated that the routers, switches, and certain other message-carrying elements (i.e., those capable of generating and/or handling message packets) may be nodes. Regardless of whether nodes or other vertices, these devices may be embodied on a single piece of silicon, on a single board, in a single unit, or distributed among several interconnected boards and/or units.

In general, communications are effected in the illustrated system by messages which pass between desired endpoints in the system along links, each link extending between one vertex and another vertex. To this end, the nodes and/or other vertices may be associated with addresses. Thus, for example, illustrated digital devices 101, 102, 103, 104, . . . , each have an address or identifier by which they may be referred in message packets sent on the fabric. Messages are packets having a defined format including, e.g., a header portion with source and target addresses, and message-type or other codes, followed by one or more data or other fields, one example of which is described below in connection with FIG. 3. The format of a message packet may differ for different types of communications or transactions, but is predetermined for each type of message.

In preferred embodiments of the invention, the routers, switches and other nodes of the link interconnect fabric 110 may be constructed and operated in the manner of the crossbar switches described in U.S. Pat. No. 5,598,568, as modified in accord with the teachings herein. The teachings of the aforementioned patent are incorporated herein by reference in their entirety.

In general, the architecture of a link fabric messaging system is intended to pass messages of defined formats and relatively small size at the link, or physical, level, using a defined protocol that allows the nodes at the ends of a link to dependably effect their message reception, handling and transmission at high speeds. The link-level message reception, handling and transmission may be effected with registers and timing or control elements, which may be implemented on a single piece of silicon or, otherwise, in a relatively small amount of logic. Such message handling circuitry may be fabricated integrally with a node or other vertex of the fabric (e.g., on a chip or board level), or it may be separate or free-standing device.

Figure 2:
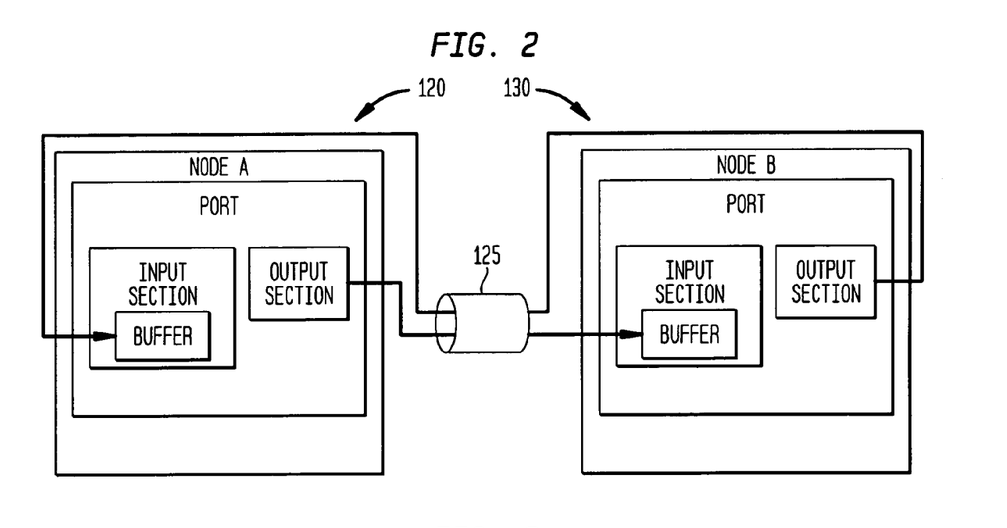
FIG. 2 illustrates two nodes connected by a link in a system of the invention.

FIG. 2 illustrates a link 125 interconnecting two nodes 120, 130 in a system of the present invention. The illustrated nodes are, by way of example, an endpoint (such as workstation 101) and a branch point (such as router or switch). The latter typically transfers messages received on the link from node 120 further along the link interconnect fabric, and vice versa. Communications between the illustrated nodes are full duplex insofar as both nodes can concurrently send and receive messages.

Each of illustrated nodes 120, 130 operates under a set of instructions such that, e.g., messages received at an input port of the node may be placed in an input section buffer, and messages or data for forming messages are passed for transmission via an output port.

The nodes may have plural input ports, or plural receiving buffers in the receiving section, for receiving messages from different links, or for receiving and ordering multiple packets constituting one or more than one different messages. The buffers may be configured so as to temporarily store received packets while message integrity and completeness are confirmed or corrected, or any necessary address, control or path configuration data are processed. Similarly, multiple output buffers and/or ports may be provided to buffer or handle data which is being transmitted (e.g., in order to match the node's I/O processing rates), to buffer data which has been transmitted (while awaiting confirmation of reception), or to otherwise hold data during a necessary message processing sequence. Further details of one suitable embodiment of the nodes as described herein for carrying out such message communications may be found in the two United States Patent Applications entitled BUS PROTOCOL INDEPENDENT METHOD AND STRUCTURE FOR MANAGING TRANSACTION PRIORITY, ORDERING AND DEADLOCKS IN A MULTI-PROCESSING SYSTEM, and entitled METHOD AND APPARATUS FOR MAINTAINING PACKET ORDERING WITH ERROR RECOVERY AMONG MULTIPLE OUTSTANDING PACKETS BETWEEN TWO DEVICES, being filed of even date herewith and bearing U.S. Ser. Nos. 09/758,855 and 09/758,864, respectively. Each of those patent applications is hereby incorporated herein by reference in its entirety.

A single link (e.g., a bus or other electrical, optical, electro-optical, or other signal carrying element) connects to a node at its ends. The nodes utilize that link to transfer, not only message packets, but also link-level information to each other. The link-level information can include information such as an indication of buffer status, an acknowledgement of message receipt, or other information necessary at the link level to assure efficient message flow and message integrity. The nodes follow defined protocols to supply or request such information or necessary parameters, and to acknowledge receipt of or request retransmission of messages in progress, such that the messaging traffic proceeds smoothly.

By way of example, in one system of the present invention, the links are full duplex, and the nodes are configured to send and receive message packets, each packet being made of a number of 32-bit words and including an error code. The words of a packet are sent over the link. A node receiving the symbols at the other end of the link checks the error code, and if the code indicates an error occurred in transmission, the receiving node sends a request on the link for retransmission. If the error code indicates the message is correct, the receiving node sends an acknowledgement that it properly received the message. Once the receiving node has acknowledged successful message reception, the sending node may clear its buffers of the transmitted message. Thus, the nodes at each end of a link are configured to assure that messages are faithfully passed over the link, yet may operate with relatively small buffer capacity to check, confirm and pass along messages in order.

The link-level information, that is the control information (distinct from the message packet information) passing between two adjacent nodes, may be encoded in relatively short blocks. In accordance with one illustrative embodiment, each of these control instructions is encoded in a single word, i.e. a "control symbol". A control symbol may be sent by a node that is transmitting a message to a receiving node. A control symbol may also be sent by a node that is receiving a message to the node that is transmitting that message. Controls symbols may also be sent over the node when no messages are being sent. Two nodes connected to the link (e.g., two router nodes, or a router and an endpoint node) may use the control symbols to exchange link-level information for controlling various link-level mechanisms. Preferably the system is implemented such that a link-level control symbol never travels over more than one link. In one typical situation, a control symbol may be transferred during the period between two message packets.

However, in accordance with one aspect of the invention, as discussed further below in connection with FIG. 4, at least some control symbols can also be interlineated among the symbols of a message packet. These symbols are referred to herein as embedded control symbols. Operation of this aspect of the invention will be best understood in the context of a specific messaging format and protocol, which will be discussed below to illustrate representative implementations of the control and coordination of messaging on a link.

By way of overview, messaging is effected as follows. Each direction of a link is composed of data signals, a frame signal, and a clock. Various physical implementations are possible. The frame signal helps delineate messages, e.g., so they may be aligned and processed in a receiving node. The frame signal is asserted at the beginning of a message packet. The frame signal may also be asserted at the beginning of a control symbol, although, as discussed further below in connection with FIGS. 4–7, it may be absent in some contexts. A single bit position, termed the "S" bit, may be used to encode whether the symbol is a control symbol (S=1) or a message packet header (S=0). The receiving node passes an incoming message in proper alignment through registers or logic and inspects bit values to determine whether it is a message packet or control symbol, and to effect its handling.

Figure 3:
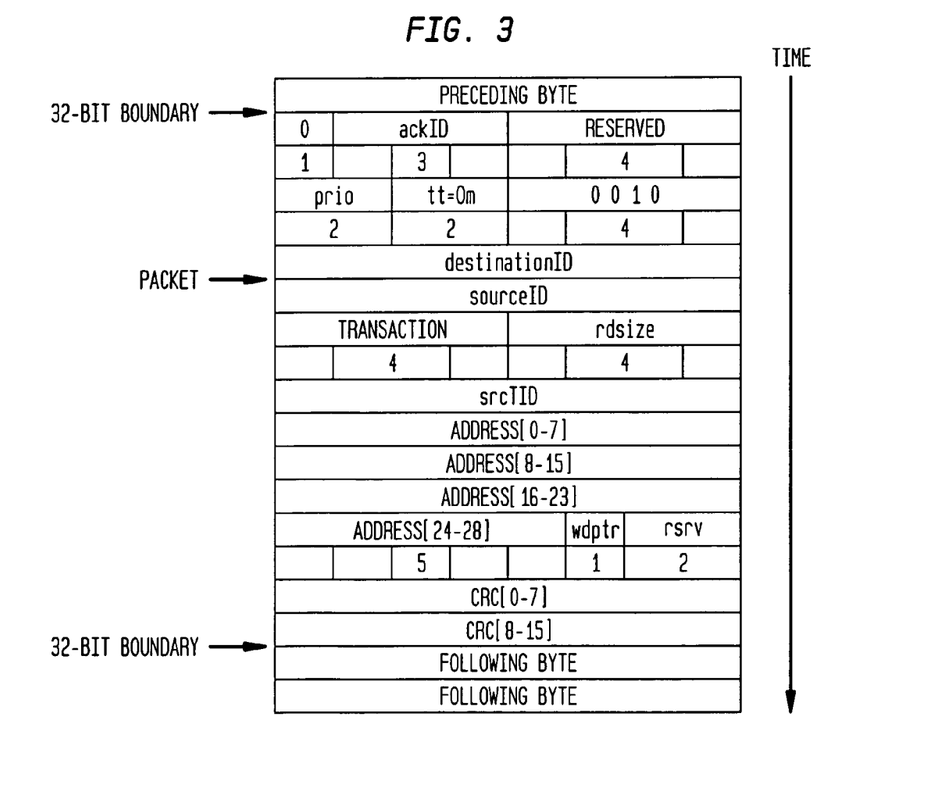
FIG. 3 illustrates representative formats for a message packet on the link of FIG. 2.

FIG. 3 illustrates representative form of a message packet useful in one embodiment of a message-passing link of the invention such as link 125 of FIG. 2.

The "symbol" or the basic unit (not necessarily a control symbol, discussed infra) is a four-byte word. In various physical implementations, the bytes may, for example, enter each node via a port eight bits wide, sixteen bits wide, or otherwise. A packet is composed of a number of such words, e.g., a sequence or ordered set of words, for example four, five or more words. It will be understood that higher level messages such as data transfers may be transmitted as message packets having a greater number of words, may be transmitted as a plurality of packets, or both. The templates are illustrative only, and particular packet types may be configured differently for different types of messages, such as transaction messages, streaming data messages, requests, responses, or other types of messages. Furthermore, link interconnect systems of the present invention may employ a basic message structure utilizing larger (or smaller) words to form the messages.

In this example, a four-byte word or symbol is the basic unit for messaging on a link. Some symbols may have specific formats. In the illustrated packet format in FIG. 3, a symbol forming the header of a message packet includes certain fields at defined bit positions. A symbol serving as link-level control symbol as discussed below in connection with FIGS. 5–7 may have different codes or fields. The control symbols, passing between two nodes at the ends of a single link, do not require addresses, and a small number of bits suffice to encode the link-level control actions (discussed further below) indicated by the control symbol. In this case, the second two bytes of the symbol may be bitwise complements of the first two bytes. In this regard, the provision of bitwise complements in the format for a control symbol provides a simple means for potential error checking at the link level. In other cases, where a symbol continues the header or is subsequent portion of a message packet, the form may differ. It will be appreciated that while the illustrated templates are shown with a basic four byte symbol, other systems may employ sixteen-bit, thirty-two bit or sixty-four bit interfaces, and may utilize formatted basic units-packet templates and symbols, with halfwords or doublewords of correspondingly different size.

Figure 4:
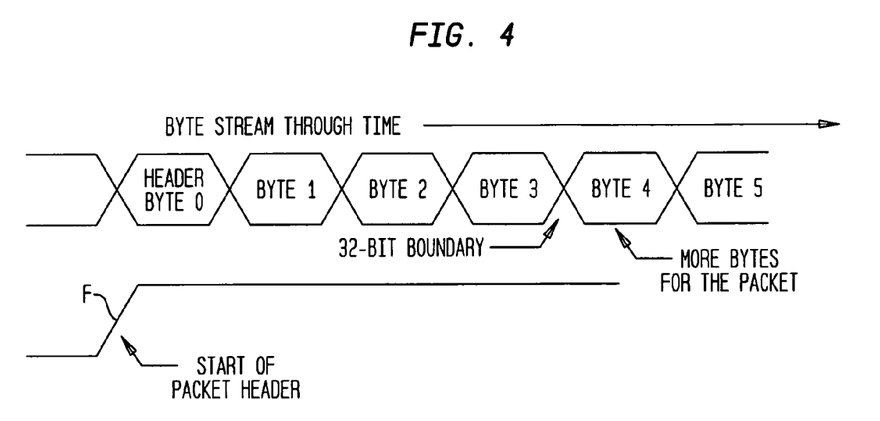
FIGS. 4 and 4A illustrate embedding of a control symbol in a message packet.

Operation of the illustrative physical implementation of a link may be effected as shown in FIG. 4. In a message packet, the first (header) symbol of a packet is asserted with a flame signal F (e.g., a line high, or line to zero signal). A node, such as node 130 in FIG. 2, receiving the header symbol and frame signal, aligns the symbol and processes (e.g., with logic) defined bit positions in the first symbol encoding information such as specifying a packet type, priority level, source and destination address, and checking or other parameters that determine packet handling. Following the first symbol, the successive symbols of a packet have defined fields that may vary for each type of message packet. Such fields may specify remote device storage addresses to be read or be written to, information about the type of transaction, block size parameters or other such information. Packets that carry data may have data fields.

In the embodiment shown in FIG. 3, the first header symbol field is a single bit S (control or message header) code as above that indicates to the link level data handling unit whether the word is a control symbol (S=1) or a message packet header (S=0). The header also includes an ackID field (a sequence identifier) employed by link-level mechanisms to order the words of a packet, and a type-indicating four bit field used to distinguish various message packet formats.

As noted above, a symbol may be control symbol used to define a link-level control action between two nodes connected to a link. Among the link-level mechanisms that may be supported by control symbols are mechanisms to effect, correct, confirm or otherwise improve message passing at the link level. One such mechanism may be a link-level retry mechanism. (This is to be distinguished from a transaction retry mechanism, e.g., a higher-level protocol of conventional type wherein two end-point devices communicating on a network effect communications to retry an entire transaction. In that case, the target device of transaction on a network would invoke such a higher level mechanism by passing a RETRY response packet through the network to the original transaction requester.) The link-level packet retry mechanism by contrast operates between two nodes to support retry of a packet or data within a packet, over a single link. Such a mechanism may advantageously be applied to recover from soft link errors. A node can invoke this mechanism by sending a suitably coded symbol over the link to the node at the other end of the link, e.g., a PACKET_NOT_ACCEPTED ACKNOWLEDGE symbol or a PACKET_RETRY ACKNOWLEDGE symbol, in which specific bits identify the ackID of the packet, and indicate that it is bad (e.g., failed some link-level test for errors, sequence or the like), or request retransmission. Various other link-level mechanisms may be supported by control symbols.

As noted above, a link uses the frame signal to delineate the start of a message packet, asserting the frame signal at the first symbol of the packet. When a control symbol is asserted with a frame signal, the first symbol of a packet may be distinguished from a control symbol by the value of the S flag bit, e.g., bit 1 of the symbol being logical 1. Several different schemes may be applied for terminating a packet. If two packets travel in immediate succession across one direction of a link, then the start of the second packet identifies the end of the first packet. Alternatively a special control symbol, e.g., an End of Packet (EOP) control symbol, may be sent to identify the end of a packet. The EOP symbol may be sent following the last symbol of the packet, or in some fixed relation to a field or feature of the packet. In one implementation, the EOP symbol may immediately follow a CRC field; in another implementation, when a final packet contains fewer than the standard number of bits (e.g., 8-, 16- . . . ), a packet may be padded and an EOP symbol may follow the pad field.

Thus, a frame signal delineates the start of a packet, and in a transmission of successive packets the frame signal of each successive packet may mark the end of the preceding packet, while for an isolated packet, a control symbol may be used to separately mark the end of the packet. The frame signal may take various forms. For example a node may toggle the frame signal for the first symbol of a packet and for each aligned control symbol, which it recognizes from packet format-type bit or a control symbol bit in the first bit position. It is not toggled for remaining symbols of a packet. With this rule, the maximum toggle rate of the frame signal is every four bytes for the described example, and the frame signal is only allowed to toggle every fourth byte, so it will naturally be aligned to a 32-bit symbol boundary, as are all words of the packets and control information.

In a preferred implementation, the interface is source synchronous. The receiving node initializes a sampling window to center the input window for reliable sampling of the incoming bytes, aligning the input clock to position incoming data with the 32-bit boundary for proper packet and control symbol extraction. This may be done by transmitting a training symbol with four bytes of logic 1 s and four bytes of logic 0 s on the interface pins, with each four-byte quantity delineated and aligned to the 32-bit boundary. The training pattern is ignored once training has been completed, and the transmitting device may continue to transmit the training symbol until it has successfully completed communications with the connected device.

The foregoing format and messaging protocol thus enables message packets to be dependably placed on a link by one node and received over the link by an adjacent node using high speed logic and message handling of packets at each end. As described above, certain steps such as error checking, requesting retransmission of ordered symbols and the like inherently involve storing or holding at least a portion of a message in a register or a buffer.

Embedded Control Symbols

In accordance with a one aspect of the invention, in order to assure that such operations minimally delay ongoing message sending, receiving, handling and passing along the interconnect fabric, control symbols may be embedded within a message packet to effect a link-level control function. The control symbol may be embedded anywhere in a packet subject to the foregoing alignment and delineation rules, and is then handled by a receiving node separately from the surrounding packet symbols.

By way of overview, one such link-level data flow control symbol is an embedded IDLE state control symbol. A messaging node may also embed an ACKNOWLEDGE symbol, a THROTTLE symbol, or a LINK_RESPONSE symbol, among others. (IDLE state and THROTTLE control symbols are each discussed in greater detail below. ACKNOWLEDGE symbols of different types may be used to confirm receipt of a symbol of a packet, or identify a symbol or packet that was corrupted. LINK_RESPONSE symbols may be used to convey necessary configuration/ messaging status information to a connected node that may be used in attempting to correct errors in a sequence of symbols of a packet being received from the sending node.)

An embedded control symbol is sent asserting the frame signal for the beginning of each embedded control symbol. A receiving node then detects the embedded control symbol, and is able to maintain packet alignment, counts and handling of the surrounding packet symbols despite the out-of-order appearance of the control symbol. That is, the receiving node message handling logic aligns the message byte and bit positions in order, as though the intervening four-byte control symbol were not there. Thus, for example, when the receiving node checks a packet error code, the inserted control symbol is not covered by a packet's error code.

Figure 4A:
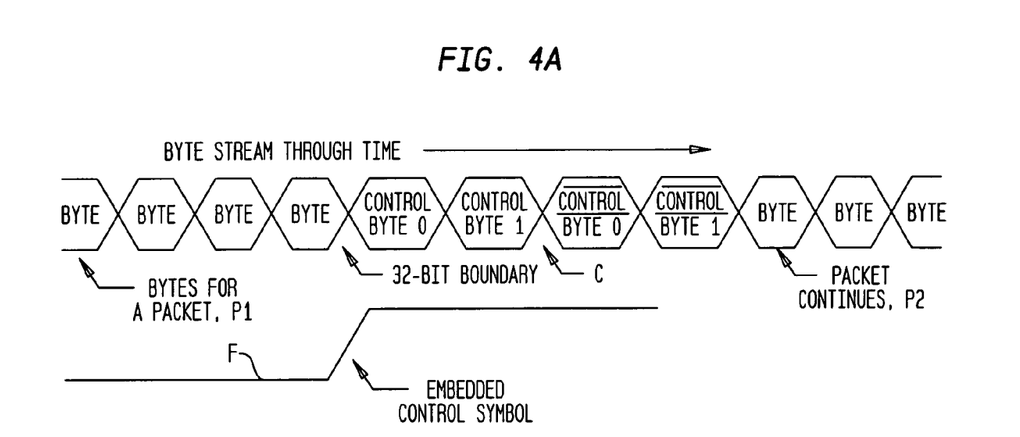
Figure 5:
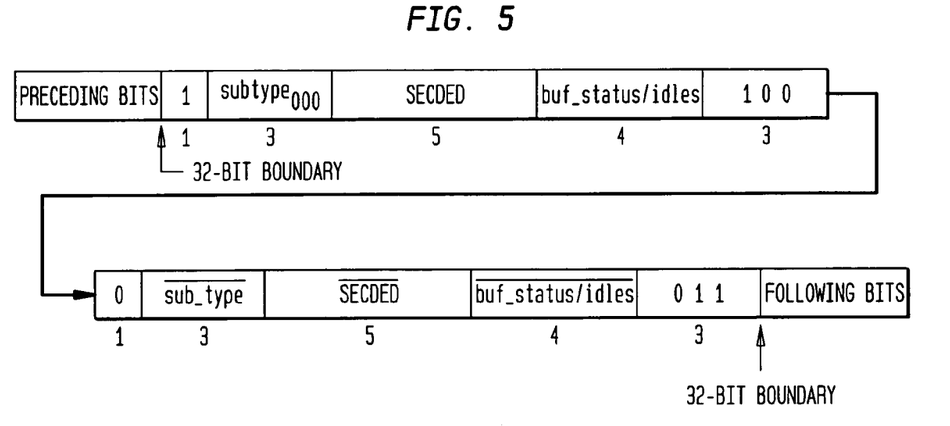
FIG. 5 illustrates a first control symbol for regulating flow of a packet transmission on a link in a system according to the invention.

FIG. 4A illustrates such embedding of a control symbol C in an ongoing message packet transmission. As shown, the bytes of the symbol C are inserted at a 32-bit symbol boundary of a stream of bytes constituting the initial symbols P1 of a packet. The frame signal F toggles at the start of the control symbol C. The remaining symbols P2 of the message then follow immediately after the four-byte control symbol, without additional frame or other indication. The receiving node is configured to process the control symbol C separately, while placing P1 and P2 in aligned order so that they are checked or handled and passed along the link fabric as a complete and properly-formatted and ordered message packet.

The control symbol is thus embedded in a manner such that a receiving node need not receive a complete message packet, before acting on the control symbol. Furthermore, the beginning and end of the interrupted packet, are aligned and handled as a single message packet, and are processed by the receiving node in properly-oriented and aligned symbols, allowing message flow to continue along the link without interruption. Thus, retransmission of the affected packet or message is not required. The result is that control operations dictated by the embedded control symbol are effected immediately and without slowing down communications.

The embedded link-level control symbols of the present invention may be of various types that individually and/or collectively control message flow and enhance traffic efficiency at the link level. One embedded control symbol may be sent to a transmitting node to direct the node to slow its transmission rate. Others may request a retransmission (from an adjacent sending node on a link), instruct a receiving node to request such a retransmission, or implementing another control function. Still other control symbols may effect other actions such as retrying or canceling multiple outstanding packets of a transmission.

IDLE State Control Symbol

One mechanism for regulating the message stream is the insertion of pacing idles. If an implementation (e.g., a sending node) cannot transmit a packet as a continuous stream of symbols, it may force wait states by inserting IDLE state control symbols, referred to herein as pacing idles. The idle state control symbol has the form shown in FIG. 5, with the three bit control code sub-type identifier (e.g., 000) in its control symbol identifier field. The IDLE (and other) control symbols may be implemented as two bytes followed by a bitwise inverted copy, and is aligned with four byte boundaries.

Transmission of a control symbol, such as an IDLE state control symbol, as embedded control symbol within a message packet in the manner described above is illustrated in FIG. 4A. As shown, a frame signal F has toggled at the start of a header symbol of a message packet, and the four-byte packet header symbol has been received. The frame signal F again toggles at a word boundary to indicate the four-byte control symbol. In the illustrated instance, the control symbol is interposed within the packet between the header symbol and the next symbol of a packet being transmitted. However, the control symbol may be interposed (embedded) after the second, third or any intermediate symbol of a packet. A receiving node recognizes the embedded control symbol by the toggled frame signal and the control symbol S flag; it identifies the specific control signal by its sub-type IDLE code bits, e.g., (000) for an IDLE state control signal. When the receiving node receives the IDLE state control symbol (or other embedded control symbol), the receiver implements the control action (if any) designated by that control symbol, meanwhile suspending its message symbol byte counts until further message packet symbols are received, which it then handles in order, disregarding the intervening IDLE symbols for its error checking or other message-handling steps. Thus, an embedded IDLE serves to delay the pace of incoming symbols of a message packet without, however, necessitating retransmission of the interrupted packet. In some embodiments, a receiving node may signal a sending node to transmit IDLE symbols, thereby suspending or slowing the rate of incoming message data.

A sending node may also transmit IDLE's after sending a complete message packet, e.g., between two message packets. However, in that case (according to some embodiments of the invention), the frame signal need not be asserted, since no associated control action need be undertaken at the receiving node for such an IDLE, and the receiving node may simply ignore an IDLE symbol between packets.

Thus, a node transmitting in a given direction on a link may intersperse pacing IDLE symbols among the symbols of a packet. It may do this to slow its transmission rate, or to indicate that it has nothing to transmit. The node asserts the frame signal at the beginning of each pacing IDLE, but need not do so for idles between packets since they do not affect system operation and thus need not be checked for errors or involve any processing by the receiving node at the other end of the link.

THROTTLE Control Symbol

In accordance with another aspect of the invention, a node receiving a packet from a link may request that the adjacent node transmitting on the link insert pacing IDLE control symbols. Thus, a receiving node may communicate at the link level to reduce the incoming data rate when necessary. Such a request is made in the form of another link-level control symbol, denoted the THROTTLE control symbol, that is passed on the opposite direction of the link to a transmitting node.

Figure 6:
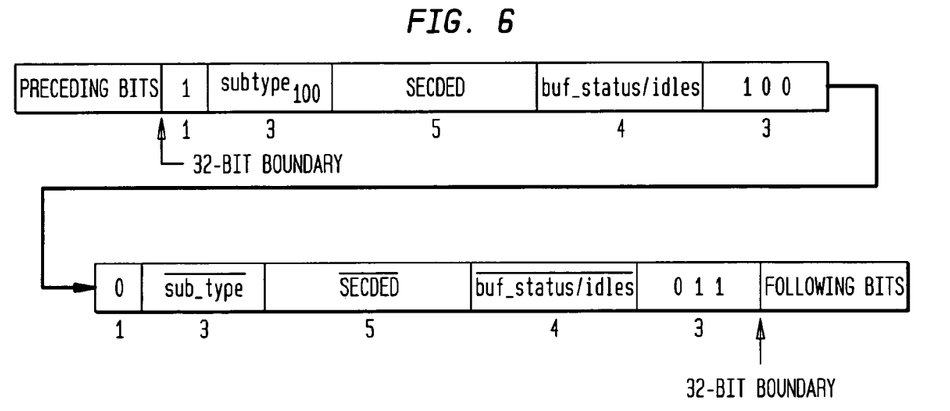
FIG. 6 illustrates a second control symbol for regulating flow of data on a link in a system according to the invention.
Figure 7:
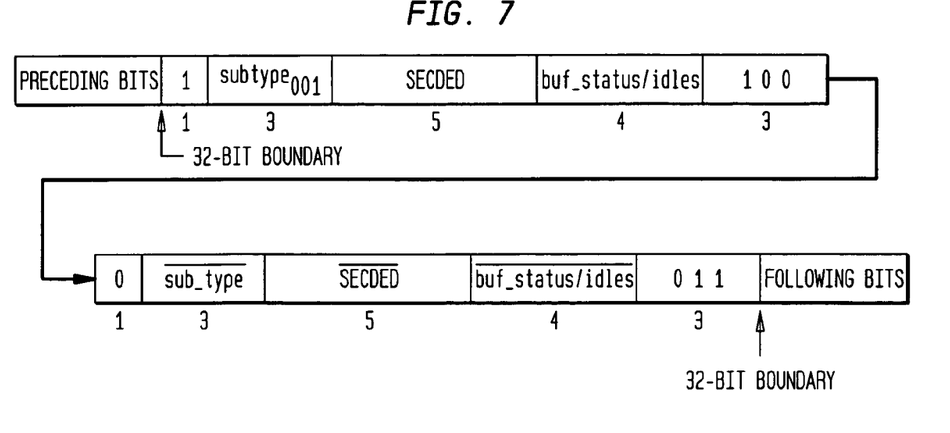
FIG. 7 illustrates a third control symbol for regulating flow of data on a link in a system according to the invention.

One suitable form for the THROTTLE control symbol is shown in FIG. 6. As shown, the THROTTLE control symbol has a three bit identifier code (100) in its control symbol identifier field, and includes an additional idles field to instruct the adjacent node to insert a specific number of pacing IDLE state control symbols. The requested number of IDLE state control symbols is specified by a four-bit number (e.g., a binary representation of a number T between 1 and 12). A node receiving the THROTTLE symbol implements it by inserting $2^T$ IDLE state control symbols in its transmission. A prototype implementation employs numbers between one and ten (0000 and 1010) in this four-bit region to enable the receiving node to call for insertion of two to one thousand idles. In this way the requesting node is able to regulate the rate at which data transmissions are sent to it on the link. The THROTTLE symbol may use others of the four-bit numbers (e.g., between 1010 and 1111) to code for other control operations. One such code may be a throttle override code (e.g., 1111) to instruct the other node to forget all previously transmitted throttle control symbols and to send no more idles (e.g., by clearing its idle-counter), thus immediately resuming packet transmission. Another such code (e.g., 1110) may signal the adjacent node to send a single aligned pacing IDLE simply to effect oscillator drift compensation, for example, to more closely synchronize the adjacent nodes.

Thus, a receiving node is able to regulate the pacing of messages being sent to it, controlling message flow in accordance with its buffer availability, processing or transmission resources, and compensating drift to reduce transmission errors. The THROTTLE symbol may also be transmitted as an embedded control symbol within a message packet as described above so as to enable its immediate implementation to reduce incoming message traffic and prevent buffer overfilling or loss of messages. Thus, both the THROTTLE symbol and the IDLE state control symbol may be sent as embedded control symbols to initiate or provide immediate regulation of message flow along the link.

Other Control Symbols

In one embodiment of a message-passing link interconnection of the present invention, the links transfer packets in order, and each packet has a field ackID indicating this order. A brief discussion of ordering or correction mechanisms related to this field and operating at the link level to enhance message flow are included here, and are more fully described in the aforesaid METHOD AND APPARATUS FOR MAINTAINING PACKET ORDERING application. The ackID field may be reassigned, and thus may be different, each time the message passes on a different link, so a special error code covering only the initial bits of the symbol may be used to check header symbol integrity without having to compute an error code for the entire massage or packet. Alternatively, these bits may be checked by simple logic and excluded from the portion to which a packet error code is applied. The output section of each node may, for example, maintain a three bit counter, and set the ackID of each outgoing packet, starting at ackID 000 for the first packet after reset. The counter is incremented each time a packet is sent, and the counter rolls over after 111.

Each input section may then maintain an input counter that indicates the next expected packet number, and checks that each received packet has the correct sequence number. If no errors are detected and the ackID is the expected number, the receiving node may sends a control symbol (denoted the PACKET_ACCEPTED ACKNOWLEDGE control symbol) over the link to the adjacent (sending) node acknowledging proper reception. Otherwise the receiving node sends a symbol (denoted the PACKET_NOT_ACCEPTED ACKNOWLEDGE control symbol) to the adjacent node causing it to initiate a retry mechanism. Both of these acknowledge control symbols include the ackID of the received packet. This flow control mechanism assures that transmitted messages are faithfully received, corrected if needed, and passed along the link fabric, thus allowing a transmitting node to quickly clear its buffers of message transactions, so that a receiving node quickly receives and passes along complete packets, while avoiding the corruption of packets in transit.

STOMP Control Symbol

In accordance with another aspect of the invention, a node may also intervene on the link by sending a control symbol to terminate a packet fragment, i.e., a faulty packet transmission, and prevent the affected packet or message from passing further. This is done with a symbol denoted the STOMP flow control symbol. One suitable form of a STOMP symbol is set forth in FIG. 7. It has a three bit identifier (001) in its control symbol identifier field.

A node may send STOMP control symbol to identify the end of an incomplete or corrupt packet that it is sending, e.g., sending the STOMP symbol following the last symbol of the incomplete or corrupt packet. The transmitting node may send this control symbol, for example, when the in-transfer packet is known to be incomplete or corrupt. This may be the case, for example, if a packet is corrupted during construction or handling by the transmitting node. It may also be the case where the transmitting node has detected (via error codes), or been notified of (via a STOMP control symbol), an error in a packet received from an upstream node. The STOMP control symbol thus also functions as an end-of-packet code, e.g., signaling early termination of an in-transfer packet.

At the other end, a receiving node may then clear the received initial bytes ("stomping" the faulty bytes); the receiving node may also issue a link-level PACKET_RE-TRY ACKNOWLEDGE control symbol to initiate a retry or retransmission of the affected bytes, or take other suitable action.

Thus, communications on the link are effected by a fast symbol passing scheme in which message packets are passed as a stream of symbols and the message-passing links check messages, generating and sending link-level control symbols within or between packets to quickly address message flow and assure that soft errors in the message packets are quickly detected and rectified without introducing collisions of the message handling steps.

The invention being thus disclosed and illustrative embodiments described herein, further variations, modifications and adaptations thereof will occur to those skilled in the art, and all such variations, modifications and adaptations are considered to be within the scope of the invention, as defined herein, and by the claims appended hereto and equivalents thereof.

What is claimed is:

1. A digital data system comprising
   a plurality of nodes interconnected by at least one link,
   the nodes being configured to communicate message packets on the link, each message packet having a format and a plurality of symbols that are transmitted by a first node on the link and received by a second node on the link, wherein the message packet is aligned in relation to a frame signal,
   at least one of said first and said second nodes being configured to communicate a link level control symbol,
   the link level control symbol being interposed between symbols of a message packet as an additional symbol to signal an adjacent node on the link,
   such that the adjacent node receives the additional symbol before completion of the message packet to effect a link level control of message flow on the link
   wherein said additional symbol is asserted with a marker whereby the adjacent node detects the control symbol within the message packet to effect said link level control of message flow
   wherein a node transmits the interposed control symbol in alignment with a symbol boundary in a message packet, whereby received data may be passed through a register of fixed size and the control symbol is discerned via the marker, permitting alignment of portions of a message packet irrespective of interposition of the control symbol therebetween.

2. A digital data system according to claim 1, wherein at least one node includes at least one of
  (i) an input buffer that at least temporarily stores a received message, and
  (ii) an output buffer that at least temporarily stores a message for transmission,
  and the control symbol effects a link level control to prevent buffer overflow.

3. A digital data system according to claim 1, wherein a message includes an error code for detecting corruption of a received message, and a receiving node that receives two portions of a message packet surrounding a control symbol realigns the received portions to apply the error code to the two portions of the message packet surrounding the control symbol.

4. A digital data system according to claim 3, where in the control symbol instructs the adjacent node to reduce its message transmission rate by transmitting a specified number of idle states so as to match receiver capacity to transmission rate.

5. A digital data system according to claim 1, wherein the control symbol instructs a receiving node to reduce its message transmission rate.

6. A digital data system according to claim 1, wherein the control symbol includes a control code for identifying one of
  i) a faulty message transmission, and
  ii) a faulty message reception.

7. A digital data system according to claim 1, wherein the link is bi-directional, and interconnects the first node at one end of the link with the second node at another end of the link, said first and second nodes being fl duplex nodes.

8. A digital data system according to claim 1, comprising a plurality of links forming an interconnect fabric among plural devices, the links interconnecting, and wherein each link has one node attached to one end of the link and another node attached to another end of the link, the nodes cooperating to route messages along interconnected links between the devices of the system.

* * * * *

UNITED STATES PATENT AND TRADEMARK OFFICE
CERTIFICATE OF CORRECTION

| | |
|---|---|
| PATENT NO. | : 7,031,258 B1 |
| APPLICATION NO. | : 09/758949 |
| DATED | : April 18, 2006 |
| INVENTOR(S) | : Bryan D. Marietta, Daniel L. Bourier and Robert C. Frisch |

It is certified that error appears in the above-identified patent and that said Letters Patent is hereby corrected as shown below:

Col. 16, line 11, following "nodes being"; please delete "fi" and insert --full--.

Signed and Sealed this

Third Day of October, 2006

JON W. DUDAS
*Director of the United States Patent and Trademark Office*